United States Patent [19]

Tomozawa

[11] 3,737,780

[45] June 5, 1973

[54] DIGITAL COMMUNICATION SYSTEM EMPLOYING UNITY BIT PER SAMPLING CODING METHOD

[75] Inventor: Atsushi Tomozawa, Tokyo, Japan

[73] Assignee: Nippon Electric Company Limited, Tokyo, Japan

[22] Filed: May 4, 1971

[21] Appl. No.: 140,033

[30] Foreign Application Priority Data

May 11, 1970 Japan ................................45/40292

[52] U.S. Cl...........................325/38 B, 340/347 DD

[51] Int. Cl...............................................H04b 1/00

[58] Field of Search................................178/DIG. 3; 179/15 BW; 325/38 B, 38 R; 332/11 D; 340/347 DD, 347 C

[56] References Cited

UNITED STATES PATENTS

| | | | |
|---|---|---|---|
| 3,296,612 | 1/1967 | Tomozawa | 325/38 B |
| 3,414,818 | 12/1968 | Reidel | 325/38 B |
| 3,183,448 | 5/1965 | Strother et al. | 325/321 |

*Primary Examiner*—Albert J. Mayer
*Attorney*—Sandoe, Hopgood & Calimafde

[57] ABSTRACT

A digital communication system reduces the transmission speed required to propagate signals resulting from a unity bit per sample coding process, e.g., delta modulation or delta-sigma modulation. The modulation wave pulses produced during cyclically recurring code converting intervals are counted and the count state transmitted rather than the modulation signal per se, thereby reducing the signal rate impressed on the communication channel. An inverse procedure is employed for signal recovery.

3 Claims, 6 Drawing Figures

INVENTOR
ATSUSHI TOMOZAWA by

Sandoe, Hopgood & Calimafde
ATTORNEYS

Patented June 5, 1973 3,737,780

2 Sheets-Sheet 2

INVENTOR
ATSUSHI TOMOZAWA by
Sandoe, Hopgood & Calimafde
ATTORNEYS

DIGITAL COMMUNICATION SYSTEM

DISCLOSURE OF INVENTION

1. Field of the Invention

This invention relates to digital communications and, more specifically, to a digital communication system in which an information signal to be transmitted is modulated by the unity bit per sample coding method and then code-converted to make the bit transmission rate per channel lower than that of the original modulated code signal. On the receiving side, an inverse code conversion or a direct demodulation is performed to substantially reproduce the original modulated signal or the information signal.

2. Description of the Prior Art

Generally, in a digital communication system employing the unity bit per sample coding method, the modulator and demodulator can be greatly simplified. The unity bit per sample coding method is a general name identifying the well-known delta-modulation and so-called delta-sigma-modulation. (The principle of the delta-sigma-modulation is detailed in a paper entitled "A unity bit coding method by negative feedback" by H. Inose and Y. Yoshida, Proceeding of IEEE, Vol. 51, p. 1524, 1963.) In this type of digital communication system, however, a higher code speed is required in order to maintain the same transmission performance as normally obtained in a PCM system. In a PCM transmission system, the transmission speed may be low for the same transmission performance as normally expected in a system employing the unity bit per sample coding method. However, a PCM system requires relatively expensive encoder and decoder apparatus.

SUMMARY OF THE INVENTION

It is, therefore, a general object of this invention to provide a digital communication system in which the less expensive encoder and decoder based on the unity bit per sample coding method are used without the heretofore associated problem of a higher transmission speed per channel.

Briefly, the system of this invention comprises a transmitting code converter in the transmitting terminal and a receiving code converter in the receiving terminal. In the former, either the digit "1" or "0" signals contained in the delta or delta-sigma-modulation signals are converted into a binary code at each predetermined time period. The series binary code signal is then transmitted in place of the delta-modulated signal. At the receiving end, the transmitted series binary code signal is converted back to substantially the same delta-modulation signal as the original delta-modulated signal.

The principle of the delta-modulation coding method for example, is well-known. Briefly descriptive of this modulation procedure, an input signal is compared with a locally decoded signal at each sampling time. The locally decoded signal is increased or decreased by a predetermined value $d$, depending on the result of the comparison. Thus, a binary code "1" or "0" is obtained at the encoder output, corresponding to the increase or decrease of the locally decoded signal. Therefore, the number of code "1's" produced during a code conversion period ($n$ times as great as the sampling period) corresponds to the number of level changes of the locally decoded signal during the code conversion period. Based on this principle, the code converter employed in the system of this invention is operated in such manner that the number of code "1's" appearing in the code conversion period is converted into a binary code representative of such number which is then transmitted through a transmission line. On the receiving side side, the code pattern in which the number of code "1's" is equal to that generated by the delta-modulation encoder is reproduced.

According to this invention, only the number of code "1's" appearing within a certain specific time interval, that is, within the code-conversion interval, is transmitted in the form of a series binary code signal, thus reducing the bit rate per channel of the binary signal to be transmitted through the transmission line.

As mentioned above, when the code conversion period is equal to $n$ times the sampling period, the number of code "1's" produced in this period assumes $(n+1)$ valves (from 0 to $n$), and hence the bit number needed for expressing the number of code "1's" in the binary code signal is $\log_2 (n + 1)$ bits. This that it is possible to considerably reduce the transmission speed per channel.

The other objects, features and advantages of the present invention will be understood from the following description of an embodiment taken in conjunction with the accompanying drawings.

DESCRIPTION OF THE PREFERRED EMBODIMENT

Figure 1:
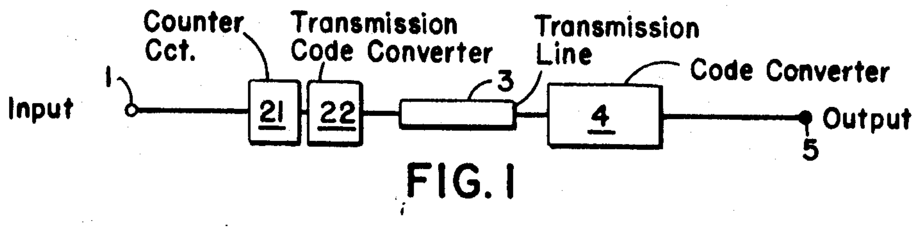
FIG. 1 is a block diagram of a digital communication system embodying the principles of this invention.

Referring to FIG. 1, there is is shown a digital communication system embodying the principles of the present invention wherein a delta-modulation signal is applied to an input terminal 1. The input delta-modulation signal is subjected to pulse counting at a counter 21 and converted at a transmitting code converter 22 into a series binary code signal, which is then sent out over a transmission line 3. At the receiving terminal, the series binary code signal which has passed through the transmission line 3 is converted back to substantially the same delta-modulation signal as the original delta-modulation signal by a receiving code converter 4, and provided at an output terminal 5.

It is assumed here tat the delta-modulation speed per channel is 70 kilobit/second (kb/s) and that the code conversion is effected at an interval of seven sampling periods (code-conversion period). In this system, the counter 21 is capable of counting down up to eight pulses at one time. For every code-conversion period the result of the count action is converted into a three digit binary code at the transmitting code converter 22. It follows therefore that transmission is performed at a transmission speed (rate) per channel of 30 kb/s which is less than one half of the value which is otherwise required. In a practical system, multiplexing gates, a frame synchronizing pulse insertion circuit, and other structure is needed. For simplicity of illustration, however, such elements are omitted in the embodiment shown and discussed. Those constituent elements may be substantially the same as those used for conventional PCM systems.

Figure 2:
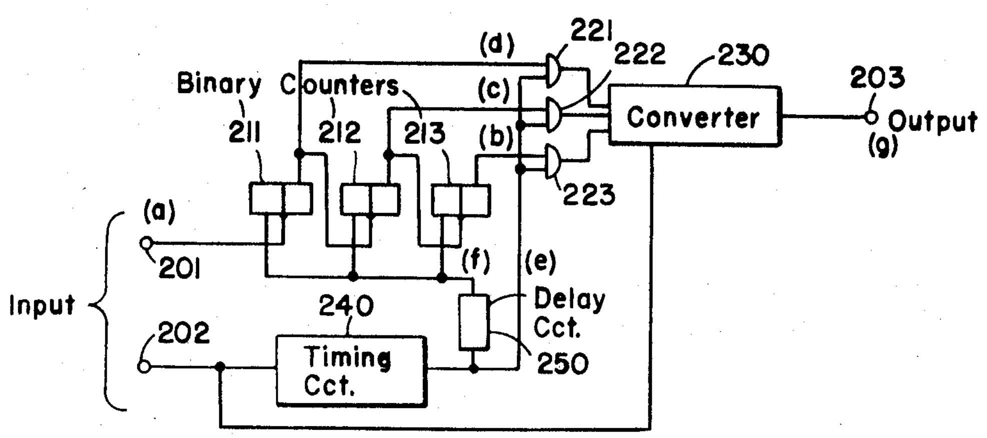
FIG. 2 is a block diagram of an illustrative transmitting code converter used at the transmitting terminal of the embodiment of FIG. 1.

Referring to FIG. 2, which shows in block diagram the details of illustrative transmitting terminal employed in the system of FIG. 1, the delta-modulation signal is applied to an input terminal 201. Binary counters 211, 212 and 213 as a whole form an octal counter to count down the code "1" signals included in the input delta-modulation signal. A clock pulse is applied to a timing circuit 240 through an input terminal 202. The timing circuit 240 generates a read-out pulse (*e*) once every seven clock pulses. In response to the read-out pulse, the contents of the counters 211 to 213 is supplied to a parallel-to-series converter 230 via coincidence gates 221 to 223, respectively. Correspondingly, the read-out pulse is slightly delayed by a delay circuit 250 and supplied as a reset pulse (*f*) to reset the counters 211 through 213.

Figure 3:
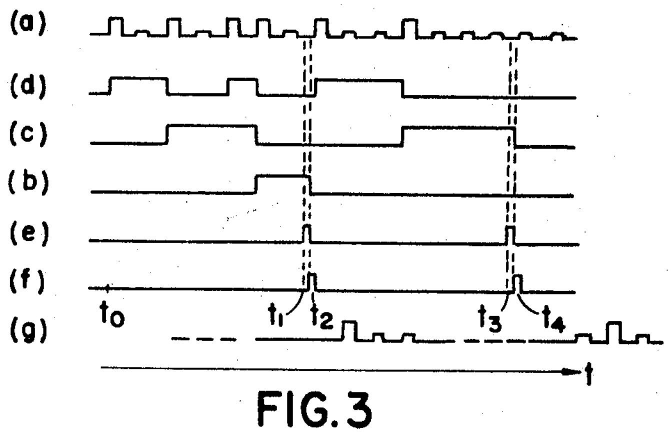
FIGS. 3 (*a*) through (*g*) show signal waveforms appearing at significant points of the circuit shown in FIG. 2.

The operation of the above circuit will be described referring to waveforms shown in FIGS. 3 (a) through (g) (hereinafter designated by 3–*a* through 3–*g*). When an assumed delta-modulation signal signal wave attains the form shown in 3-*a*, the number of code "1's" in one code conversion period running from time point $t_o$ to $t_1$ is four. Hence, the code content at the counters 211 – 213 is "100" as indicated by 3-*b*, *c* and *d*. This code content is read-out in response to the read-out pulse of waveform 3–*e* occurring at the time point $t_1$ and applied to the parallel-to-series converter 230, which then delivers a serial binary code signal as shown in FIG. 3-g. The reset pulse 3–*f* resets all the binary counters 211 through 213 at time point $t_2$. There are two "1" codes contained in the next code conversion period running from time point $t_2$ to $t_3$. Accordingly, a code "010" corresponding to the two "1" digital signals is delivered to the output terminal 203 in the same manner as described above.

In the foregoing description, the 3-g is shown to have the same transmission speed (or the same sampling period) as that of the delta-modulated input code train 3-*a*. However, in a practical digital communication system employing delta-modulation, the parallel binary code outputs derivered from the gates 221 – 223 are sampled and multiplexed, by a common sampling pulse with a common sampling period, together with other binary code trains corresponding to the other channels. Therefore it will be apparent to one skilled in the art that the common sampling period may be longer or shorter than, or equal to, the sampling period of the delta modulation signal, and that the multiplexing process as mentioned above can be performed by including in the parallel-to-series converter 203 memory circuits each storing the output of one of the gates 221 – 223 (such as bistable circuits) and a sampling gate for sampling the outputs of the memory circuits employing the common sampling pulse.

Figure 4:
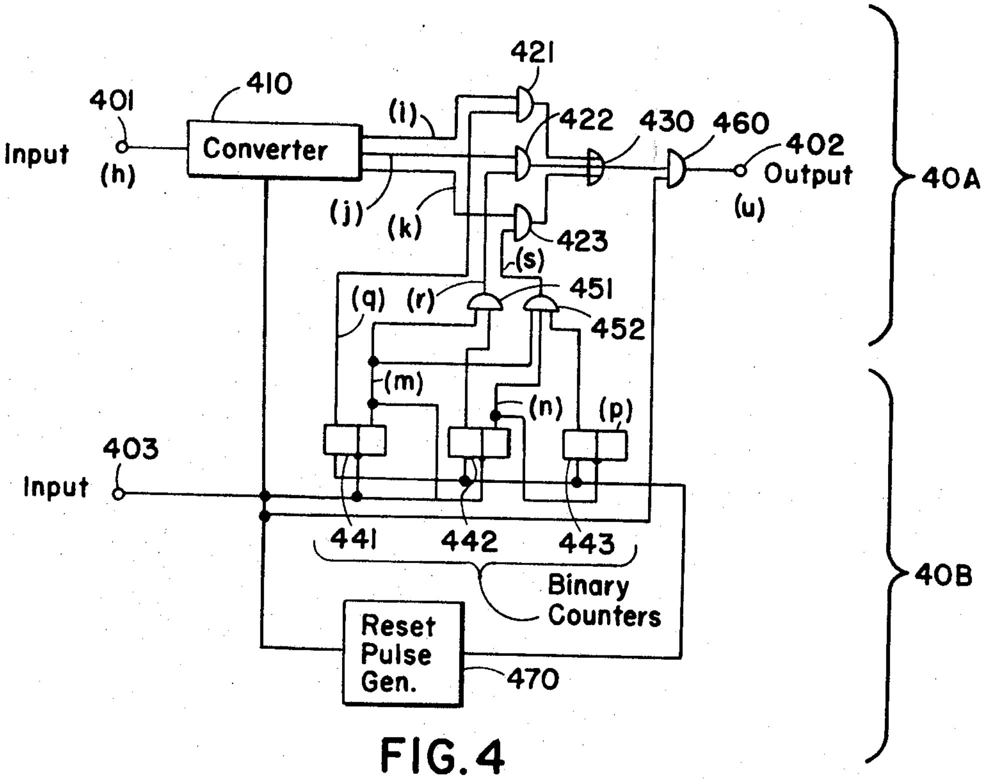
FIG. 4 is a block diagram of an illustrative receiving code converter employed at the receiving terminal of the system of FIG. 1.

FIG. 4 shows in block form the details of an illustrative receiving code converter 4. This converter comprises: a pulse synthesizer circuit 40A comprising an input terminal 401 to which is supplied the series binary code signal transmitted from the transmitting terminal through the transmission line 3, a series-to-parallel converter 410, AND gates 421 to 423 and 460, an OR gate 430, and an output terminal 402; a pulse generator circuit 40B comprising an input terminal 403 to which a clock pulse is supplied, binary counters 441 to 443, and a reset pulse generator 470; and AND gates 451 and 452. The operation of this receiving code converter is described below referring to waveforms shown in FIGS. 5 (*h*) through (*u*) (designated by 5-*h* through 5-*u* hereunder).

Figure 5:
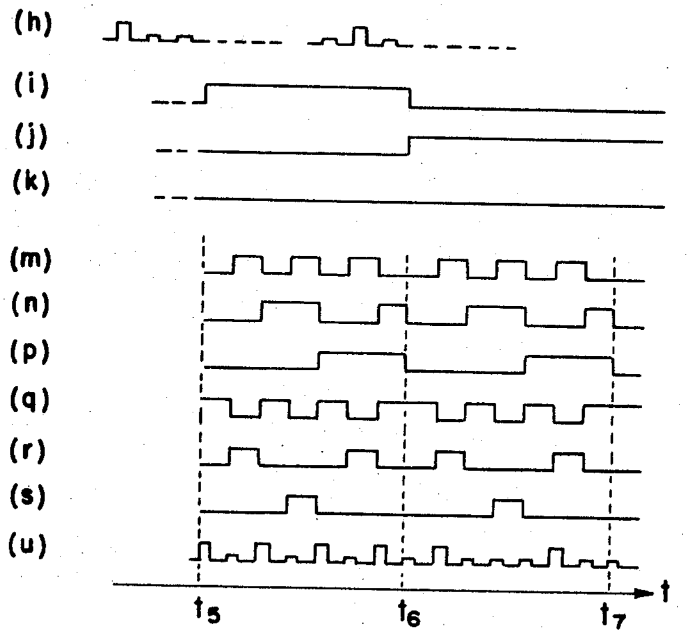
FIGS. 5 (*h*) through (*u*) show signal waveforms appearing at significant points of the circuit shown in FIG. 4.

When an input code 5-h is received, the outputs 5-*i*, *j* and *k* of the series-to-parallel converter 410 become "1," "0" and "0" at time point $t_5$. These outputs respectively correspond to the individual digits of the input binary code 100. At this moment, the pulse generator 470 generates a reset pulse to reset the binary counters 441 – 443. In this way, the binary counters 411 – 443 start counting the input clock pulse from the beginning, i.e., from a cleared reference state. FIG. 5-*m*, *n* and *p* show the changes of the true outputs of the individual counters 441 to 443 respectively. These outputs are combined with the complementary outputs by the AND gates 451 an 452. Thus, four, two and one pulses 5-*q*, 5-*r*, and 5-*s*, respectively, are generated with mutually complementary, distinct timing during the code conversion period running from time point $t_5$ to $t_6$.

These pulses waveforms 5-*q*, 5-*r* and 5-*s* are selectively synthesized by the AND gates 421 through 423 and the OR gate 430 in response to the particular received input code. Thus a number of pulses given by the specific received input code are supplied at the output terminal 402. For the period running from time point $t_5$ to $t_6$, only the signal 5-*i* having the weight of 4 is a binary "1" and, hence, the signal 5-*q* causes four pulses to be generated in one code conversion period through the enabled gate 421. These four pulses are sampled by the clock pulses applied to the terminal 403. Thus, the output signal 5-*u* is delivered at the output terminal 402 through the gate 460. In the code conversion period running from time point $t_6$ to $t_7$, the input code is 010, and the signal 5-*r* (and only this signal) is gated through to the output terminal 402 in response to this input code.

Similarly, when the input code is 101 signaling that there are five "1" code pulses in the code conversion period, the pulse waves 5-*q* and 5-*s* are gated by the gates 421 and 423, respectively, combined by the OR gate 430, and sampled by the gate 460 using the clock pulse from the terminals 403. Thus, the output pulse containing five "1" code pulses in the code conversion period is obtained at the terminal 402.

Figure 6:
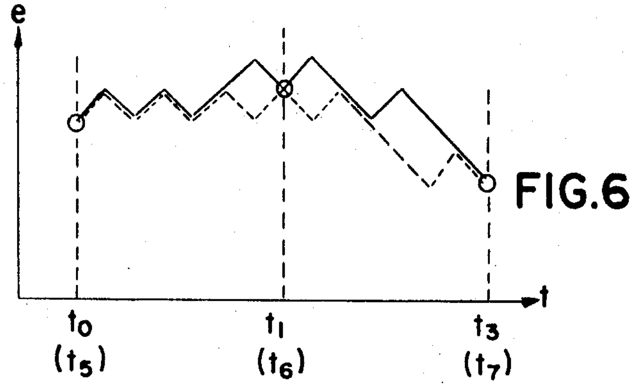
FIG. 6 shows the decoded and reproduced signal waveform at the receiving terminal compared with the corresponding waveform reproduced at the transmitting terminal by the local decoder in the delta-modulation encoder.

Referring to FIG. 6, a typical waveform at the local decoder output of the delta-modulation encoder (not shown) at the transmitting terminal, in response to the delta-modulated code 3-*a*, is shown in solid line, and the corresponding reproduced waveform shown in dashed line. The latter is obtained by decoding (i.e. integrating) the output 5-*u* shown in FIG. 5. Although not shown in the drawing, the decoded signal (in dotted line) is subjected after decoding to a low-pass filter for reproducing the original signal wave. As will be seen from FIG. 6, the decoded signal is not exactly identical in its waveform to the output of the local decoder at the transmitting terminal. However, those values of the amplitude of the decoded signal which are viewed at the respective time points $t_5$, $t_6$ and $t_7$ (corresponding to $t_o$, $t_1$ and $t_3$ of FIG. 3) coming at the ends of the respective code conversion period, are substantially equal to those at the delta-modulator output. It follows therefore that the original waveform can be reproduced with high degree of approximation by suitably choosing the clock frequency and the code conversion period.

In the foregoing embodiment, the digital transmission system is assumed to operate as a whole in synchronism with input delta-modulation signal at the transmitting terminal. As is apparent to those skilled in this technical field, the system may be asynchronous with respect to the input delta-modulation signal. Even for the asynchronous system, the total number of pulses produced remains unchanged. Therefore, the frequency slip between the two clock pulses, one at the transmitting terminal and the other at the receiving terminal, causes only a small amount of phase jitter and insertion or removal of code "o" depending on which one of the frequencies is higher. Since the presence or absence of only 1 bit in a delta-modulation pulse train does not substantially affect the waveform of a reproduced signal, the signal transmission according to this invention does not cause any significant amount of error in the waveform transmitted.

For such a modification, the clock pulse applied to the clock terminal 202 in FIG. 2 need not be in synchronism with that of the input code signal. On the other hand, in the receiving code converter shown in FIG. 4, the output pulse signal is synchronized with another clock applied to the terminal 403. As a result, the clock frequency of the input delta-modulation code differs from that of the regenerated output signal. This, however, does not cause an appreciable amount of error since the delta-modulation demodulator is only expected to function as an integrating circuit.

In the foregoing illustration, the cascaded pulse counters 211 - 213 and 441 – 443 are adapted to count the "1" digits only. This may be "0" if those counters are adapted to respond to "0" signals.

When the invention is applied to a time-division multiplexed delta-modulation communication system, most of the constituents of the present system may be used in common with those of the other multiplexed delta-modulation channels on the time division basis. A very limited number of additional system elements will be needed for such a modification, such as a counter circuit for the transmitting code converter and a pulse synthesizer circuit for the receiving code converter.

As mentioned above, the delta-modulation/demodulation employed in the foregoing embodiment is of the type for the one-bit per sample coding method. However, this invention can be applied to a system employing another coding type of this kind, that is, the so-called delta-sigma modulation/demodulation. The delta-sigma modulator, similar to the delta-modulator, comprises a subtractor, a decision circuit and an integrator. The connection of those circuit elements is somewhat different from that of the delta-modulator. As illustrated in the foregoing article, the input signal is decremented by the output signal in the subtractor whose output is integrated by the integrator. This integrated output is supplied to the decision circuit. Thus, the amplitude of the input signal is converted to a code density, that is, a variable number of code "1's" occurring within a certain time interval. Therefore, it will be apparent that this invention can be applied to the communication system employing the delta-sigma modulation/demodulation.

As is apparent from the foregoing, the present invention makes a great contribution to miniaturization and less costly manufacture of a digital communication system.

What is claimed is:

1. A digital communication system comprising:

a transmitting terminal including:

means for receiving a digital modulation signal generated by applying a digital modulation based on the unity bit per sample coding method to an original information signal;

means for counting the number of one of the digits "0" and "1" of said digital modulation signal during each of predetermined code conversion periods, means for reading out the contents of said counting means about the end portion of each said code conversion periods to form a parallel binary code signal representative of said number at each said end period portion, and means for converting said parallel binary code signal to a series binary code signal to transmit the same through said transmission channel; and a receiving terminal including:

means for receiving said series binary code signal transmitted through said transmission channel, and means for reproducing from the received series binary code signal an output code signal substantially identical to said digital modulation signal.

2. A code conversion system comprising:

a counter for counting the number of one of input codes "0" and "1" contained in a supplied input digital modulation signal, based on the unity bit per sample coding method, during each of predetermined code conversion periods;

means for generating reset pulses resetting said counter about the end portion of said code conversion periods;

means for reading out the contents of said counter immediately before said counter is reset by said reset pulses to form a parallel binary code signal representative of said number at each said period end portions; and means for converting said parallel binary code signal into a serial binary code signal.

3. A system as in claim 2 further comprising receiving means connected to said converting means, said receiving means comprising:

means for converting said received series binary code signal into a recovered parallel code signal at each said code conversion period, plural pulse generators each generating differing characteristic, weighted pulse trains with mutually complementary timing, and gating means each responsive to a different pair of each digit of said recovered parallel code signal and each of said weighted pulse trains for generating a recovered series binary code signal substantially identical to said digital modulation signal.

* * * * *